(12) United States Patent
Engel

(10) Patent No.: US 10,427,332 B2
(45) Date of Patent: Oct. 1, 2019

(54) FIBER PLACEMENT AND PRODUCTION METHOD

(71) Applicant: Airbus Defence and Space GmbH, Ottobrunn (DE)

(72) Inventor: Franz Engel, Munich (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 148 days.

(21) Appl. No.: 15/647,102

(22) Filed: Jul. 11, 2017

(65) Prior Publication Data

US 2017/0305041 A1    Oct. 26, 2017

Related U.S. Application Data

(62) Division of application No. 14/728,480, filed on Jun. 2, 2015, now Pat. No. 9,757,879.

(30) Foreign Application Priority Data

Jun. 3, 2014 (EP) .................................... 14001915

(51) Int. Cl.
*B29C 35/08* (2006.01)
*B29C 70/38* (2006.01)

(52) U.S. Cl.
CPC ...... *B29C 35/0805* (2013.01); *B29C 35/0888* (2013.01); *B29C 70/38* (2013.01)

(58) Field of Classification Search
CPC ....... H04L 67/22; H04L 67/306; H04L 67/02; G06F 9/451; G06F 3/0481
See application file for complete search history.

(56) References Cited

U.S. PATENT DOCUMENTS

| | | |
|---|---|---|
| 6,451,152 B1 | 9/2002 | Holmes |
| 2009/0311506 A1 | 12/2009 | Herbeck et al. |
| 2011/0011538 A1* | 1/2011 | Hamlyn .................. B29C 70/38 |
| | | 156/436 |

(Continued)

FOREIGN PATENT DOCUMENTS

| | | |
|---|---|---|
| DE | 10 2007 009 124 A1 | 8/2008 |
| EP | 0 491 353 A1 | 6/1992 |

(Continued)

OTHER PUBLICATIONS

"Coriolis Composites", Nov. 14, 2011 https://www.youtube.com/watch?v=-qAaJwm11dg.

(Continued)

*Primary Examiner* — Vishal I Patel

(74) *Attorney, Agent, or Firm* — Crowell & Moring LLP

(57) ABSTRACT

A fiber application tool for a fiber placement and production method has a fiber contact surface area, which has a fiber contact surface for applying and/or pressing the fibers onto a work surface. The tool further includes an activation device for activating an adhesive, matrix, resin, or binder material provided at the fibers by means of an activation radiation so that the fibers are tacked onto the work surface. The fiber contact surface area for the activation radiation may be transparent and that the activation device may be designed so to guide and/or deliver the activation radiation through the transparent fiber contact surface area to the fibers to be pressed by the fiber contact surface.

4 Claims, 3 Drawing Sheets

(56) References Cited

U.S. PATENT DOCUMENTS

2015/0013885 A1* 1/2015 Li .................. B29C 70/386
                                                                        156/166

FOREIGN PATENT DOCUMENTS

| EP | 1 749 631 A1 | 2/2007 |
| WO | WO 2014/107555 A1 | 7/2014 |

OTHER PUBLICATIONS

"Advanced manufacturing—automated fiber placement", May 3, 2013, https://www.youtube.com/watch?v=DV1n35pabXs.
"Ingersoll AFP", Jan. 3, 2009 https://www.youtube.com/watch?v=QDbrVTWnFIU.
European Search Report dated Dec. 11, 2014, with Partial English translation (Seven (7) pages).

* cited by examiner

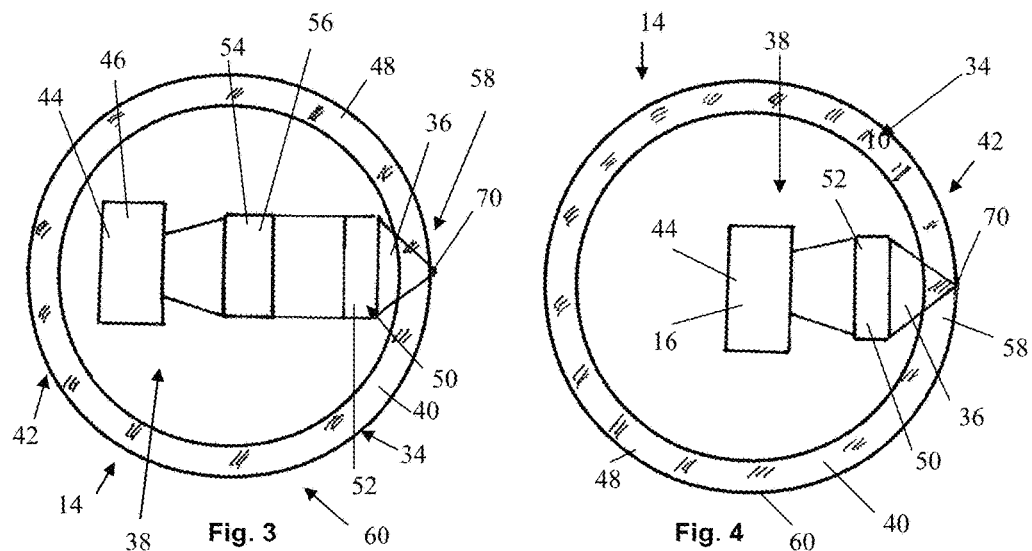
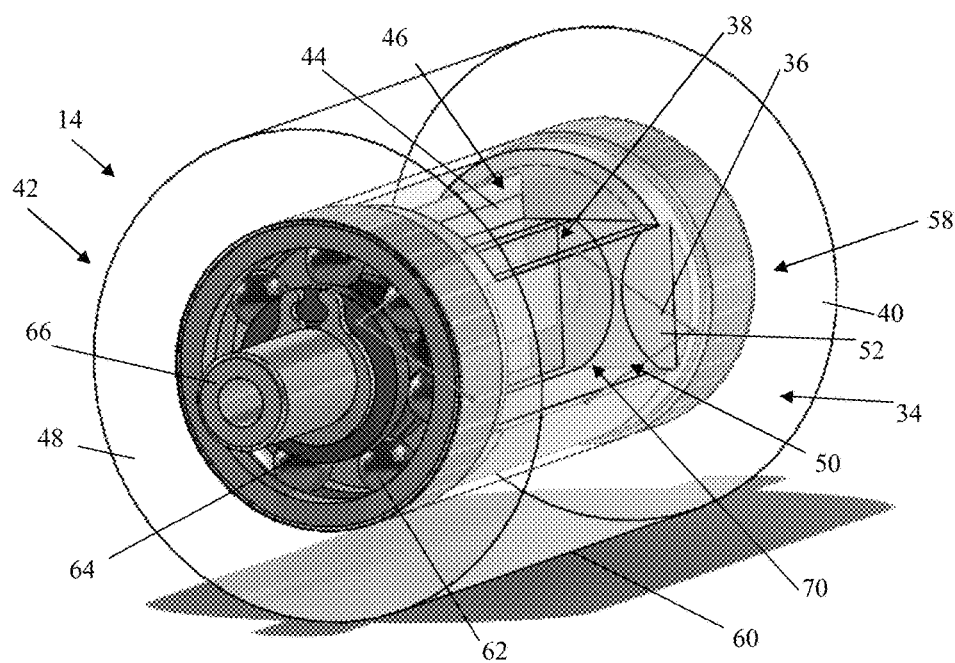
Fig. 5

FIBER PLACEMENT AND PRODUCTION METHOD

CROSS-REFERENCE TO RELATED APPLICATIONS

This application is a divisional of U.S. application Ser. No. 14/728,480, filed on Jun. 2, 2015, which claims priority under 35 U.S.C. § 119 to European Application No. 14001915.9, filed Jun. 3, 2014, the entire disclosures of which are expressly incorporated by reference herein.

BACKGROUND AND SUMMARY OF THE INVENTION

Exemplary embodiments of the present invention relate to a fiber application tool for a fiber application process having a fiber contact surface area, which has a fiber contact surface for contacting fibers for the purpose of redirecting and/or pressing fibers for application onto a work surface and having an activation device for activating an adhesive, matrix, resin, or binder material provided at the fibers by means of an activation radiation so that the fibers are tacked onto the work surface. Furthermore, the exemplary embodiments relate to a fiber placement device for, preferably, automatically carrying out a fiber placement method having such a fiber application tool. Furthermore, the exemplary embodiments relate to a fiber placement method and a production method for producing work pieces made up of fiber-reinforced material by using such a fiber placement method.

A preferred field of application of a fiber application tool according to the present invention are automatic fiber placement methods, known as "Automatic Fiber Placement" (AFP).

Such fiber application tools, fiber placement devices, and respective fiber placement methods suitable for AFP are, for example, known from the following Internet videos:
http://www.youtube.com/watch?v=-qAaJwm11dg, published on 14 Nov. 2011;
http://www.youtube.com/watch?v=DV1n35pabXs, published on 3 May 2013;
http://www.youtube.com/watch?v=QDbrVTWnFIU, published on 3 Jan. 2009.

Examples from the patent literature for such fiber application tools and fiber placement devices suitable for automatic fiber placement are described and shown in EP 0 491 353 A1 or EP 2 882 681 A1.

In an automatic fiber placement method, fibers are unwound from a spool or the like, which are situated in the area of a head of a motion apparatus—for example, a robotic arm—and are applied in a desired orientation and arrangement onto a work surface by a fiber application tool in the form of a fiber application roller or compaction roller. For this purpose, an outer circumferential area of the roller serves for redirecting, applying, and pressing the fibers. In addition to a fiber delivery device for delivering continuous filaments or fiber material bands, the fiber application tool, a cutting device for cutting fibers and, furthermore, an activation device are thus also provided at the placement head. In order for the fibers to tack to the work surface, the fiber material is provided with a binder or resin or the like, and this adhesive material may be, for example, activated by heat or activation radiation, so that a tacking of the placed fibers results. These activation devices are also carried along at the head.

Accordingly, in fiber placement, energy sources—so-called activation units or activation devices—are, as a function of the used material, used for starting to melt the binder or the resin on the fiber material. The fiber material having the partially molten binder or partially molten resin is then pressed by a roller onto the work surface—for example, a tooling. In this instance, a compaction also occurs. Pressure and activation have to be adjusted in such a way that the fiber material is affixed to the tooling. The activation unit has to heat-up the fiber material as quickly as possible to the required temperature so that it is sufficiently molten at the time of compaction.

As it is know from the aforementioned related art, the following methods are established for activation:
Laser for heating the tooling—i.e., the work surface—before the roller;
Infrared for heating the tooling—i.e., the work surface—before the roller;
A heated roller for directly activating the binder or the resin; or
Hot gas for activating the binder or the resin and for pre-heating the tooling or the work surface.

Accordingly, the placement head moved by the motion apparatus also carries the activation units; for this purpose, for example, an activation device for emitting activation radiation—laser radiation or LED infrared light or the like—is situated on the work surface for pre-heating the same.

The known fiber placement devices thus have a very bulky and heavy placement head. In the case of a heated roller, a targeted activation and handling is difficult. Altogether, the known placement method uses a relatively large amount of energy for the activation.

The present invention improves, in particular, AFP but also other fiber placement methods having activatable binders or similarly suited fiber placement devices and fiber placement methods.

For this purpose, the present invention suggests a fiber application tool, a fiber placement device, a fiber placement method, and a production method according to the independent claims.

Advantageous refinements of the present invention are the subject of the dependent claims.

According to a first aspect, the present invention provides a fiber application tool for a fiber placement process—in particular, for a fiber placement method or AFP method—having a fiber contact surface area, which has a fiber contact surface for contacting fibers for the purpose of redirecting and/or pressing fibers for application onto a work surface and having an activation device for activating an adhesive, matrix, resin, or binder material provided at the fibers by an activation radiation for affecting a tacking of the fibers onto the work surface, and the fiber contact surface area is transparent for the activation radiation and the activation device is designed and devised in such a manner that the activation radiation is guided and/or delivered through the transparent fiber contact surface area to the fibers to be pressed by the fiber contact surface.

"Fibers" refer to fiber materials in different forms, also in form of fiber bands or fiber fabric bands or the like.

It is preferred that the fiber contact surface is formed at the circumference of a fiber application and/or compaction roller; that at least one circumferential surface area, having the fiber contact surface, of the fiber application and/or compaction roller is designed in a transparent manner; and that the activation device is designed and devised for guiding the activation radiation starting from the interior of the fiber application and/or compaction roller through the transparent circumferential area to the fibers to be activated, which contact the circumferential surface area according to the specified usage.

It is preferred that a circumferential partition of the fiber application and/or compaction roller made up of transparent material, which forms the fiber contact surface area or surrounds the fiber contact surface at the outer circumference in form of a cylinder barrel, is made out of transparent plastic and/or glass.

It is preferred that the fiber application and/or compaction roller has an inner bearing segment not rotatable relative to a placement head or the like, which is to be mounted at a motion apparatus for relatively moving across the work surface, and a tubular body or roller body, at least partially made up of transparent material, which is rotatable relative to the bearing segment and surrounds the bearing segment at the circumference, and the activation device is situated at the inner bearing segment.

It is preferred that the activation device is designed and devised in such a manner that the activation radiation is guided through the transparent circumferential area into an angular range, in which fiber is redirected at the roller and which is located in rotational direction in front of the contact area, where the fiber is applied upon contact.

In one possible refinement it is preferred that the activation device has an interior light source and/or an interior LED in the fiber application tool for delivering the activation radiation. In this manner, the activation radiation may be produced in the interior of the fiber application tool.

Alternatively, it is preferred that the activation device uses an external radiation source for the activation radiation, for example, an external light source and/or an external LED, by which the activation radiation, for example, the light radiation may be produced outside of the fiber application tool, and a guiding device for guiding the activation radiation from the radiation source into the interior of the fiber application tool. The guiding device may have a light conducting device, for example, a glass fiber or a light conductor. The light conducting device may also include a light path having a deflection mirror or the like. This option enables to easily access the radiation source and is less restricted in regard to dimensions; however, a very compact fiber application tool delivering the radiation from the interior through the transparent fiber contact surface is possible.

Under both options of internally and externally producing radiation, the activation device may have a focusing device for focusing the activation radiation onto or near the outer surface of the fiber contact surface area forming the fiber contact surface. A focusing device is then advantageous if the radiation intensity is relatively low. If a high radiation intensity may be generated in the area of the fibers, a focusing may be foregone.

It is preferred that the focusing device has at least one focusing lens to directly irradiate the fibers that are in contact with the fiber contact surface through the transparent fiber contact surface area.

It is preferred that the distances between the light source and/or the LED on the one hand and the at least one focusing lens on the other are chosen in such a manner that the focus point is located directly on the fiber contact surface. Alternatively, the light source energy is chosen high enough so that a focusing is not necessary.

It is preferred that the internal light source and/or LED and/or the focusing device and/or an outlet of the radiation guiding device are situated in the fiber application and/or compaction roller.

According to a further aspect, the present invention provides an automatic fiber placement device for automatically placing fibers onto a work surface, including:

a fiber delivery device for delivering fibers, in particular, in the form of continuous filaments unwinding from a fiber spool or in form of a fiber band or fiber material band;

a fiber application tool according to one of the preceding refinements;

a cutting device for cutting the fibers to a desired length;

and a motion apparatus for moving the fiber application tool relative to the work surface to apply and press the fibers delivered by the fiber delivery device onto the work surface.

According to a further aspect, the present invention provides a fiber placement method for automatically placing fibers onto a work surface, including:

a) Applying and pressing fibers provided with adhesive, binder, matrix, or resin material by a transparent fiber contact surface; and b) Guiding activation radiation through the fiber contact surface for activating the adhesive, binder, matrix, or resin material.

It is preferred that step b) occurs before step a).

It is preferred that step a) includes:

Applying and pressing fibers using a fiber application and/or compaction roller, which has at least one transparent circumferential surface area; and that step b) includes:

Guiding the activation radiation through the transparent circumference area.

Preferably, the following step is provided: delivering fibers to the fiber application and/or compaction roller and redirecting fibers at a fiber contact surface designed for redirecting until contact with the work surface is established, and the activation radiation in the area for redirection is guided prior to contacting the work surface through the fiber contact surface and onto the fibers.

According to a further aspect, the present invention provides a production method for matrix composite work pieces, including the steps:

Producing a preform by carrying out an automatic fiber placement method according to one of the preceding embodiments; and Producing the work piece from the preform.

In a particularly preferred embodiment of the present invention, a compaction roller or a miscellaneous fiber application roller is equipped with an internal light source in form of an LED and possibly with a focusing lens to radiate the fiber directly. In this instance, the roller is made up of a transparent material and has a respective roller element made up of such transparent material. The distances between the lenses and the LED are preferably adjusted in such a manner that the focus point is directly located on the surface of the roller. Since the fibers are directed across the surface, they are situated directly in the focus point.

Some advantages of preferred embodiments of the present invention are:

a compaction roller remains cold on the outside;

the activation unit or activation device is very compact in comparison to other solutions;

a light emission of the fiber placement device is very low;

a light source is well and quickly regulated;

when using a binder for laying down, not the binder but the fiber is radiated.

A low light emission of the system is very advantageous, in particular, in systems having optical in-line quality control.

A quick and simple regulation of the light source is particularly advantageous owing to the adaptation to the lay-down speed.

Altogether, a device for applying fibers that is very compact, energy optimized, and also optimized from a process engineering viewpoint and a respective fiber placement device are created.

BRIEF DESCRIPTION OF THE DRAWING FIGURES

In the following, exemplary embodiments of the present invention are described in more detail on the basis of the appended drawings.

FIG. 3 shows a sectional view of a first embodiment of a fiber application tool;

FIG. 4 shows a sectional view through a fiber application tool according to a second embodiment;

FIG. 5 shows a schematic perspective view of a further embodiment of the fiber application tool.

DETAILED DESCRIPTION

Figure 1:
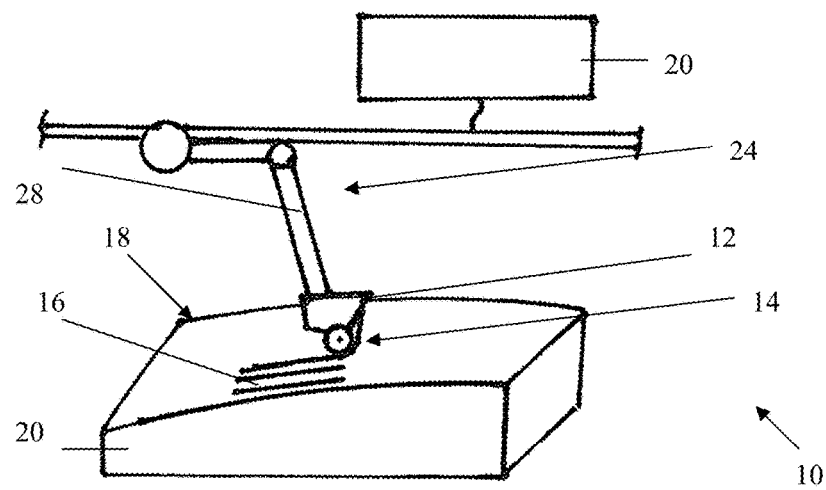
FIG. 1 shows a schematic illustration of a fiber placement device for the automatic placement of fibers.
Figure 2:
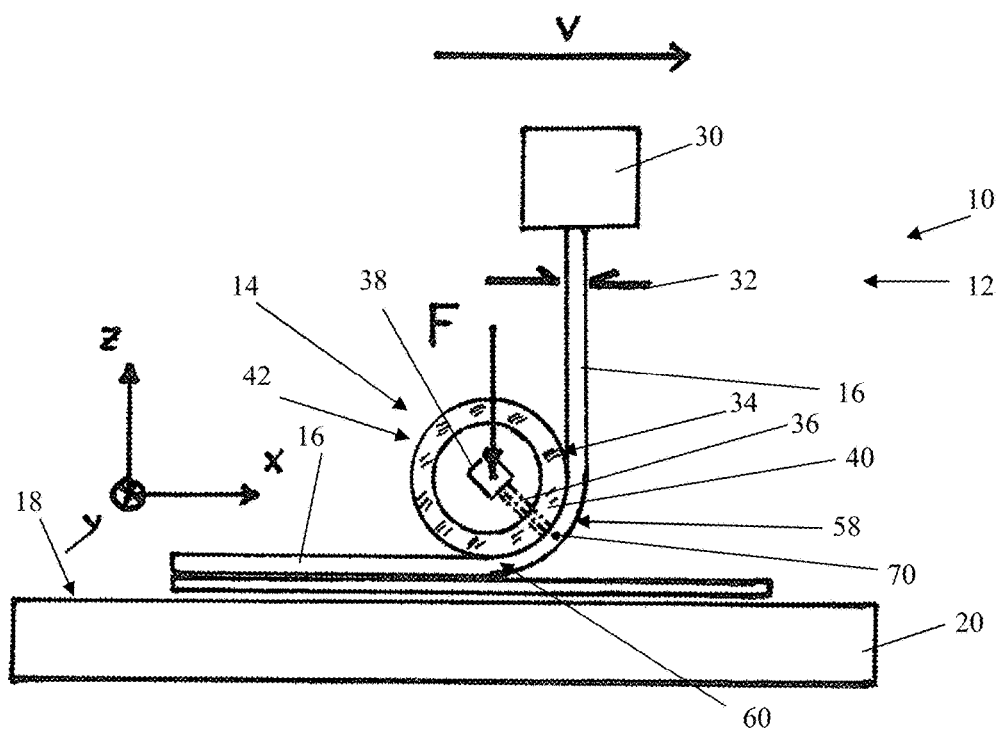
FIG. 2 shows a schematic side view for illustrating the principle of the automatic fiber placement and a plurality of devices at the placement head of the fiber placement device including a fiber application tool.

FIGS. 1 and 2 schematically illustrate a fiber placement device 10 when carrying out an automatic fiber placement method, in particular, an AFP method or fiber placement method. For this purpose, FIG. 1 shows an overview of the fiber placement device 10, while FIG. 2 schematically shows in greater detail a detail view of a placement head 12 having a fiber application tool 14.

Fiber placement device 10 is designed for the automatic placement of fibers 16 onto a work surface 18. In particular, the fiber placement device is designed for placing fibers 16 onto a surface of a form tool 20. For this purpose, fiber placement device 10 has a control 22, in which a respective lay-down plan for laying-down fibers 16 onto respective work surface 18 known from the form is filed. Fibers 16 are placed in predefined paths and have a predefined quantity.

Fibers 16 may appear in varying forms, for example, different fiber material, for example, fiber bands, spread fiber bundles, fiber filament or the like may be used, and the fiber material when processed in placement head 12 is already provided with an adhesive material, a matrix material, or resin material. For example, a prepreg fiber filament band or a binder-impregnated fiber band may be delivered.

For this purpose, fiber placement device 10 has a motion apparatus 24, by which placement head 12 having fiber application tool 14 may be moved along specified paths of work surface 18. Motion apparatus 24 has, for example, a robotic arm 26. In this way, placement head 12 is movable in direction X, direction Z, and direction Y; furthermore, said placement head 12 is rotatable in a desired orientation. In FIG. 2, placement head 12 is corresponding to its movement indicated by a velocity vector v.

At placement head 12, a fiber delivery device 30 is provided for delivering fibers 16 still in continuous form and a cutting device 32 for cutting fibers 16 to a desired length.

Furthermore, fiber application tool 14 has a fiber contact surface 34, which contacts to-be-placed fibers 16 to redirect them, apply them to work surface 18, and to press and compact them under pressure.

As already mentioned above, fibers 16 are delivered having an activatable adhesive material, matrix material, resin material, or binder material, which may be activated by heat and, in particular, by means of an activation radiation 36. Activation radiation 36 is preferably designed in the form of a light radiation or infrared radiation.

For this purpose, fiber application tool 14 has an activation device 38 for delivering activation radiation 36.

Fiber contact surface 34 is formed at a fiber contact surface area 40 of fiber application tool 14, and fiber contact surface area 40 is transparent for activation radiation 36.

Activation device 38 is designed in such a manner that activation radiation 36 radiates from behind, starting from the side opposite of fiber contact surface 34 of fiber contact surface area 40 through fiber contact surface area 40 to fiber contact surface 34 to irradiate fibers 16 engaging at fiber contact surface 34 and, thus, to activate the respective adhesive material or binder material.

Fiber application tool 14 has, in particular, a fiber application and/or compaction roller 42. Fiber contact surface 34 is formed at a circumferential area of fiber application and/or compaction roller 42. In other words, a circumferential area—for example, a circumferential partition—of fiber application and/or compaction roller 42 forms fiber contact surface area 40 and is, at least partially, made up of the transparent material for activation radiation 36. Fiber application and/or compaction roller 42 is mounted in a rotating manner at placement head 12 and may roll, by moving placement head 12 along work surface 18, onto work surface 18. In this instance, said fiber application and/or compaction roller 42 redirects, as shown in FIG. 2, fibers 16 coming from fiber delivery device 30 and presses said fibers onto work surface 18.

Activation device 38 has, in particular, a light source 44, preferably in the form of at least one LED 46. The refinements illustrated in FIGS. 3 through 5 are, however, designed in such a manner that light source 44 or LED 46 is situated internally of fiber application and/or compaction roller 42. In the embodiment illustrated in FIG. 6, activation device 38 has a guiding device 72, such as, in particular, a glass fiber 74 or a light conductor, by which, in an external radiation source 76, for example, an external LED, produced activation radiation may be guided into the interior area of fiber application and/or compaction roller 42.

In particular, fiber application and/or compaction roller 42 and activation device 38 form a very compact unit in this manner. Fiber application tool 14 thus may limit its exterior dimensions to the exterior dimensions of fiber application and/or compaction roller 42. For example, the largest dimension—for example, formed by the diameter of roller 42—is less than 10 cm, in particular, less than 5 cm and, in particular, more than approximately 2 cm (+/−0.5 cm).

Figure 6:
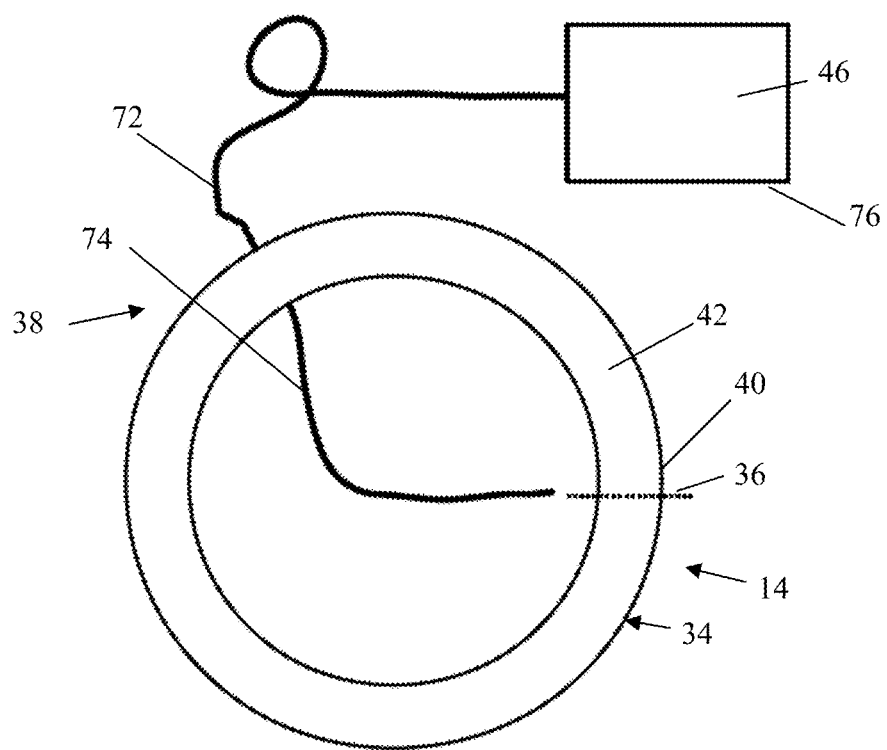
FIG. 6 shows a schematic perspective view of a further embodiment of the fiber application tool.

FIGS. 3, 4, and 6 show possible refinements of fiber application tool 14.

Accordingly, fiber application and/or compaction roller 42 has a roller body or tubular body 48 having a cylinder barrel (example for a circumferential partition) made up of transparent plastic or glass or miscellaneous transparent, resistant, and compactable material for activation radiation 36. In the interior of tubular body 48 or roller body, LED 46 or the outlet of light conducting device 72 is provided. Furthermore, a focusing device 50 for focusing activation radiation 36 onto the exterior surface of tubular body 48 may be provided. Tubular body 48 forms fiber contact surface area 40 and the outer circumferential surface of tubular body 48 forms fiber contact surface 34. Focusing device 50 delivers in particular a focus point immediately at this exterior surface and, for this reason, at fiber contact surface 34. It is also possible, depending on the thickness of to-be-delivered fibers 16, to situate the focus point in close distance just outside of the outer circumferential surface and, thus, to situate it in the interior of fibers 16 thereon engaged.

Focusing device 50 may have one or a plurality of focusing lenses 52.

According to a further refinement and as indicated in FIG. 4, a collimator device 54 having at least one collimator lens 56 may be provided. The focusing device may, however, also be completely omitted, as indicated in FIG. 6. Even though the last option not having a focusing device is illustrated by the example of the external radiation production and guiding device, it is also possible in refinements producing radiation internally, when the radiation is sufficiently high.

As shown in FIG. 2, activation device 38 is preferably devised in such a manner that it irradiates activation radiation 36 into redirection area 58, where fibers 16 are redirected, and which is in rotational direction located just in front of contact point 60, where fibers 16 are pressed onto work surface 18 by fiber application and/or compaction roller 42. Using tubular body 48, placement head 12 presses fibers 16 with force F onto work surface 18, while it is moved across work surface 18 by velocity v.

A possible, specific construction of fiber application tool 14 is illustrated in FIG. 5.

Here, outer tubular body 48 is mounted in a rotating manner by ball bearings 62 at a bearing segment 64, which may be, by means of a fixing unit 66, fixed in a stationary manner to a positioning device at placement head 12. At bearing section 64, activation device 38 having LED 46 and focusing device 50 is provided in the interior of transparent tubular body 48.

The position and radiation direction of activation device 38 may be adjusted by respectively positioning fixing unit 66. The application of the fibers and compaction are carried out by rolling tubular body 48 by means of fiber contact surface 34 formed at the outer circumference of tubular body 48.

Respective fiber placement device 10 is able to carry out an extremely advantageous automatic fiber placement method. Activation device 38 is located in the interior of fiber application and/or compaction roller 42; for this reason, placement head 12 is embodied in an extremely compact manner and activation device 38 is safely situated.

Activation radiation 36 may be specifically metered and carried out with a low radiation intensity. Respectively, less energy input is required.

As illustrated in FIG. 1, in particular a preform of a work piece made up of fiber-reinforced composite material may be produced in this instance. Form tool 20 having the preform subsequently produced by laying down fibers 16 may then be produced in further processes known in principle by respective soaking using resin-matrix material and the like.

Although fiber application tool 14 and the thereby provided fiber placement device 10 is described by the example of AFP methods having a roller for pressing fibers, the present invention is not limited to the tools or devices or methods respectively designed for carrying out an AFP method. For example, the idea of an activation by an activation radiation guided through a transparent fiber contact surface area could be also realized in other placement devices, for example, a laying die, having other forms of fiber contact surfaces, in particular, in so-called fiber patch preforming methods, as shown and described in WO2008/110614.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE CHARACTERS

10 Fiber placement device
12 Placement head
14 Fiber application tool
16 Fiber
18 Work surface
20 Form tool
22 Control
24 Motion apparatus
28 Robotic arm
30 Fiber delivery device
32 Cutting device
34 Fiber contact surface
36 Activation radiation
38 Activation device
40 Fiber contact surface area
42 Fiber application and/or compaction roller
44 Light source
46 LED
48 Tubular body
50 Focusing device
52 Focusing lens
54 Collimator device
56 Collimator lens
58 Redirection area
60 Contact surface
62 Ball bearing
64 Bearing section
66 Fixing unit
68 Preform
70 Focus point
72 Guiding device
74 Glass fiber
76 External radiation source, for example external light generator, such as LED

The invention claimed is:

1. A fiber placement method for automatic placement of fibers onto a work surface by a fiber application and/or compaction roller having a fiber contact surface formed at a circumference of the fiber application and/or compaction roller, the method comprising:
  a) applying and pressing fibers provided with adhesive, binder, matrix, or resin material by the transparent circumferential fiber contact surface; and
  b) guiding activation radiation starting from an interior of the fiber application and/or compaction roller through the transparent circumferential fiber contact surface for activating the adhesive, binder, matrix, or resin material.

2. The fiber placement method according to claim 1, wherein step b) occurs before step a).

3. The fiber placement method according to claim 1, further comprising delivering the fibers to the fiber application and/or compaction roller and redirecting the fibers to a redirection area until a contact with the work surface is established,
   wherein the activation radiation is guided in a focusing manner through the redirection area just prior to contacting the work surface onto the fibers.

4. A production method for producing matrix composite work pieces comprising:
   producing a preform by carrying out an automatic fiber placement method according to claim 1; and
   producing the work piece from the preform.

* * * * *